United States Patent
Emam et al.

(10) Patent No.: US 9,632,850 B1
(45) Date of Patent: Apr. 25, 2017

(54) POLLING PARAMETER ADJUSTMENT

(71) Applicant: International Business Machines Corporation, Armonk, NY (US)

(72) Inventors: Ossama Emam, Mohandessen (EG); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/147,229

(22) Filed: May 5, 2016

(51) Int. Cl.
*G06F 13/00* (2006.01)
*G06F 9/54* (2006.01)

(52) U.S. Cl.
CPC ........... *G06F 9/542* (2013.01); *G06F 9/546* (2013.01)

(58) Field of Classification Search
CPC ..................................... G06F 9/542
USPC ..................................... 719/318
See application file for complete search history.

(56) References Cited

U.S. PATENT DOCUMENTS

| | | | |
|---|---|---|---|
| 6,621,827 B1 | 9/2003 | Rezvani et al. | |
| 7,077,746 B2 * | 7/2006 | Torango | G07F 17/3258 463/16 |
| 8,204,032 B2 | 6/2012 | Gao et al. | |
| 2007/0294392 A1 * | 12/2007 | Balasubramanian | G06F 9/542 709/224 |

OTHER PUBLICATIONS

"Technique to continuously improve configuration parameters of a software component connected to an endpoint", An IP.com Prior Art Database Technical Disclosure, <http://ip.com/IPCOM/000235827>, IP.com No. IPCOM000235827D, Publication Date: Mar. 26, 2014, 7 pages.

IBM, "Applying predictive technique for self-adaptive polling in WebSphere Adapters", an IP.com Prior Art Database Technical Disclosure, <http://ip.com/IPCOM/000186428>, IP.com No. IPCOM000186428D, Publication Date: Aug. 20, 2009, 6 pages.

* cited by examiner

*Primary Examiner* — Andy Ho
(74) *Attorney, Agent, or Firm* — Maeve Carpenter

(57) ABSTRACT

An approach, executed by a computer, includes receiving at least an initial polling quantity and an initial polling frequency and polling an endpoint application using the initial polling quantity and the initial polling frequency. The approach includes determining a first number of events not consumed in a queue of a listening application and a second number of events generated at the endpoint application and remaining in a queue at the endpoint application and comparing the number of events in each queue. The approach includes adjusting at least one of the initial polling quantity and the initial polling frequency based, at least in part, on the comparison of the first number of events not consumed in the queue of the listening application and the second number of events generated at the endpoint application and remaining in the queue at the endpoint application.

20 Claims, 5 Drawing Sheets

US 9,632,850 B1

POLLING PARAMETER ADJUSTMENT

BACKGROUND OF THE INVENTION

The present invention relates generally to the field of multicomputer data transferring and more particularly to data transfer using an adapter with dynamically determined, adjusted polling parameters.

A software adapter is a type of software that is logically located between two software components and reconciles differences between the components to enable data transfer and communication. One example of a software adapter is a resource adapter that retrieve and route data, provide access to databases, files, messaging systems, enterprise applications and other similar data sources. Each software adapter may include a set of adapter commands to specify different data queues, queue managers, specific messages and other similar information and data. Software adapters typically include various integration products to enable data transformation and adapter-specific behavior on different systems and data structures in addition to extending service-oriented architecture applications.

A software adapter enables two-way communication, for example, between an application running on an application server, process manager, or a service bus and an enterprise information system (EIS). With a software adapter, an application can send requests to an EIS, as well as receive data or events from an EIS. The bi-directional data flow may be inbound or outbound. In the case of inbound event flow, two modes of operation are commonly used. A pull or poll model in which the client system or application polls the EIS at regular intervals for data or events, and a push model in which the EIS sends events to the client system or application, as the events are generated.

In a pull model, a software adapter may be configured to poll the EIS on a scheduled interval to retrieve a number of events. The selection and determination of the schedule for polling and the number of events provided in a poll cycle are important for efficient data and event transfer between software or system components (e.g., bandwidth between the EIS, an adapter and the client system or application).

SUMMARY

Embodiments of the present invention disclose a method, a computer program product and a system for adjusting polling parameters. The method includes a computer receiving at least an initial polling quantity and an initial polling frequency and polling an endpoint application using the initial polling quantity and the initial polling frequency. The method includes a computer determining a first number of events not consumed in a queue of a listening application and a second number of events generated at the endpoint application and remaining in a queue at the endpoint application. Furthermore, the method includes comparing the first number of events not consumed in the queue of the listening application and the second number of events generated at the endpoint application and remaining in the queue at the endpoint application at the end of the polling cycle. Additionally, the method includes a computer adjusting at least one of the initial polling quantity and the initial polling frequency based, at least in part, on the comparison of the first number of events not consumed in the queue of the listening application and the second number of events generated at the endpoint application and remaining in the queue at the endpoint application.

DETAILED DESCRIPTION

Embodiments of the present invention provide a method, a computer program product, and a system to dynamically adjust polling parameters using a software element on an adapter that is polling a system or endpoint application, such as an enterprise information system (EIS), based on the rate of consumption of events at an application and the rate of generation of events at the endpoint application. Embodiments of the present invention provide a method to update polling parameters for a polling cycle based, at least in part, on a comparison of the number of events in a queue at an application and a queue at an endpoint application using a software element or program in an adapter. Additionally, embodiments of the present invention provide a method to adjust polling parameters for a poll group made up of a pre-determined number of polling cycles based, at least in part, on polling statistics gathered over the number of polling cycles in the poll group.

Figure 1:
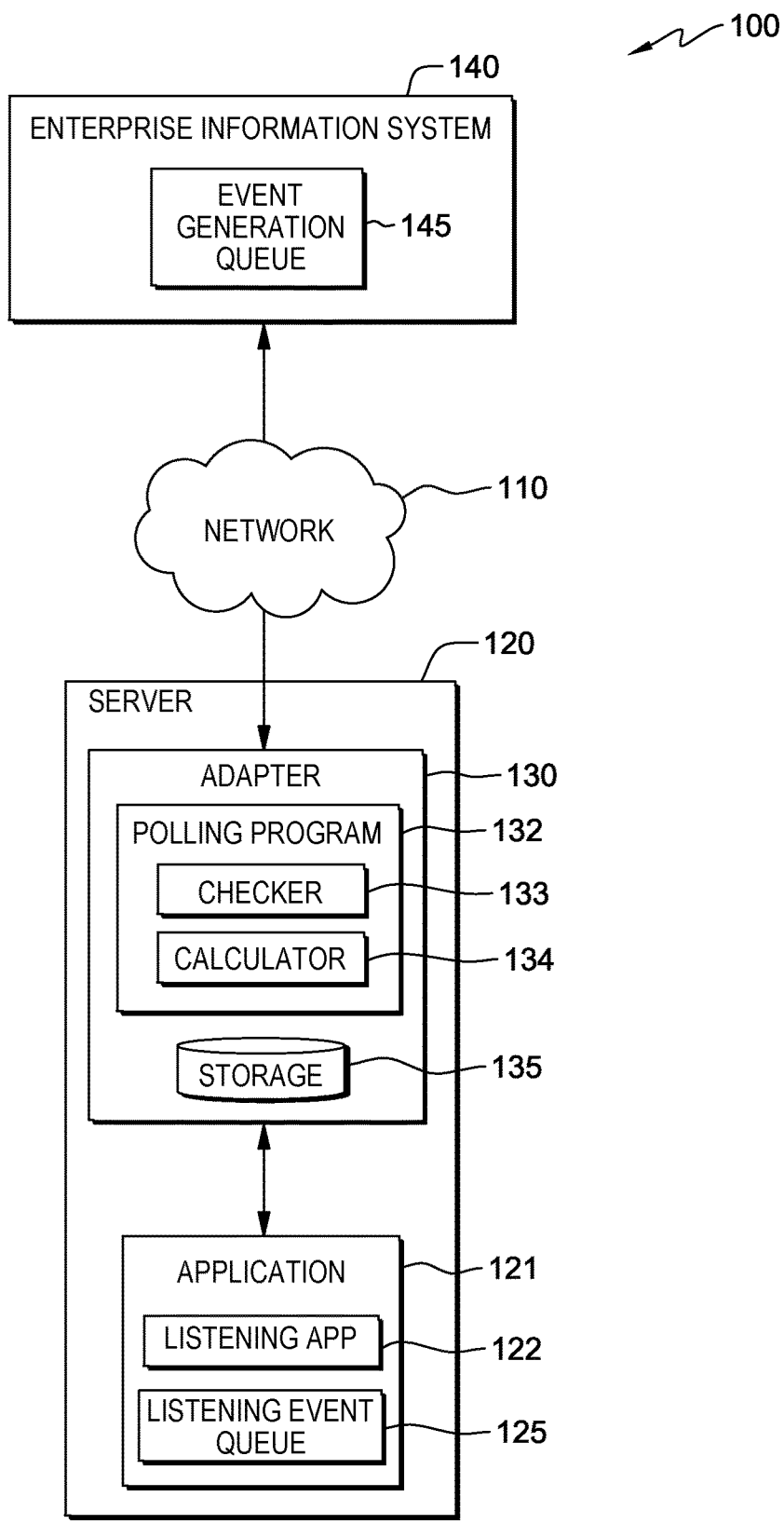
FIG. 1 is a functional block diagram illustrating a distributed data processing environment, in accordance with at least one embodiment of the present invention.

FIG. 1 is a functional block diagram illustrating a distributed data processing environment, generally designated 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes server 120, application 121, adapter 130 and enterprise information system 140 interconnected over network 110. Network 110 can include, for example, a telecommunications network, a local area network (LAN), a virtual LAN (VLAN), a wide area network (WAN), such as the Internet, or a combination of the these and can include wired or wireless connections. Network 110 can include one or more wired and/or wireless networks that are capable of receiving and transmitting data such as events or polling requests. In general, network 110 can be any combination of connections and protocols that will support communications between application 121, adapter 130 and enterprise information system 140 and other computing devices (not shown) within distributed data processing environment 100.

Server 120 may be an application server, a management server, a web server, a mainframe computer, a desktop computer, a notebook, a laptop computer, a mobile computing device or any other electronic device or computing system capable of receiving, sending and processing data. As depicted in FIG. 1, server 120 is an application server that includes application 121 and adapter 130. In various embodiments, server 120 represent a computing system utilizing clustered computers and components (e.g., database server computers, application servers, etc.) that act as a single pool of seamless resources such as used in a cloud-computing environment when accessed within distributed data processing environment 100. In another embodiment, server 120 can be a laptop computer, a tablet computer, a netbook computer, a personal computer (PC), a desktop computer, a personal digital assistant (PDA), a smart phone or any programmable electronic device capable of communicating with EIS 140 via network 110. Server 120 may include internal and external hardware components, as depicted and described in further detail with respect to FIG. 5.

As depicted in FIG. 1, application 121 is a software application on server 120. Application 121 may be a software application on an application server, a process manager, a client system, or other computer (not depicted in FIG. 1). Application 121 may reside on a standalone computing device such as an application server, a web server computer, a management server computer, a laptop computer, a mobile computing device or any other electronic device or computing system capable of receiving, sending and processing data. In the depicted embodiment, application 121 includes listening app 122 and listening event (LE) queue 125. In an embodiment, application 121 includes the function and code of adapter 130.

Application 121 sends and receives data to/from adapter 130 and to/from EIS 140 through adapter 130. Application 121 may send and receive data from adapter 130 via network 110. While depicted as a single application, application 121 may be one or more applications deployed on an application server or servers connected to adapter 130 and EIS 140.

Listening app 122 is a listening application resident on application 121. Listening app 122 provides known listening capabilities for data received by application 121. Listening app 122 may monitor, receive and direct information and data such as events received by application 121. An event may be any create, update or retrieve operation performed on an enterprise information system such as EIS 140. Listening app 122 may send to LE queue 125 received data such as events received from EIS 140. For example, listening app 122 may send events received in response to a polling request from EIS 140 to LE queue 125 for consumption by application 121. In an embodiment, LE queue 125 is included in listening app 122. In various embodiments, more than one listening app is associated with application 121. In an embodiment, LE queue 125 resides in one or more databases (not depicted) in distributed data processing environment 100.

LE queue 125 is a queue maintaining or storing information and data such as events received from event generating (EG) queue 145 on EIS 140. LE queue 125 stores data and events in the order received by application 121 from a source such as EIS 140. In an embodiment, LE queue 125 receives data and events from more than one event generation queue.

Adapter 130 is a software adapter. As depicted in FIG. 1, adapter 130 resides in server 120. Adapter 130 provides an ability for two-way communication and information exchange between application 121 and EIS 140. Adapter 130 may utilize known industry standard connection protocols or architecture (e.g., Java® based connector architecture). As known to one skilled in the art, adapter 130 may be connected to multiple applications 121 and/or multiple EIS 140. As depicted, adapter 130 includes polling program 132 and storage 135. Adapter 130 using polling program 132 sends and receives instructions and data such as events and polling requests to and from application 121 and EIS 140.

Polling program 132 includes checker 133 and calculator 134. Polling program 132 may send polling requests to EIS 140, receive events from EIS 140 and may send received events from EG queue 145 on EIS 140 to LE queue 125 in application 121. Polling program 132 monitors polling event queue sizes for EG queue 145 at EIS 140 and LE queue 125 at application 121. Polling program 132 may determine an adjustment to polling parameters for improved data transfer (e.g., neither EG queue 145 or LE queue 125 accumulate too much data or events). Polling program 132 using calculator 134 may initialize arrays and track various values in arrays, queues, lists or other data structures during a polling cycle, in each polling cycle in a polling group and in a polling group.

Polling program 132 may poll EIS 140 based on polling parameters such as a polling frequency (e.g., how often a polling request is sent, which is determined by a time or polling interval between polling requests) and a polling quantity (i.e., a number of events retrieved per poll request or polling cycle). As depicted in FIG. 1, polling program 132 may poll a queue such as EG queue 145 on EIS 140 that stores the events or data generated at EIS 140. The polling request may retrieve events generated at EIS 140, and transmit events and data to polling program 132 on adapter 130 for delivery on to listening app 122 and LE queue 125 for consumption by application 121.

Checker 133 in polling program 132 checks the number of events in LE queue 125 and EG queue 145 at the end of each polling cycle. Checker 133 retrieves the number of events not yet consumed by application 121 from LE queue 125 and sends the number of events to calculator 134 and storage 135. Similarly, checker 133 retrieves the number of events generated by EIS 140 and the number of events remaining in EG queue 145 at the end of each polling cycle. Checker 133 may retrieve the number of events in LE queue 125 and EG queue 145 as one of the last steps in a polling cycle. For example, checker 133 may determine the number of events waiting at EG queue 145 and LE queue 125 as the next to the last step in the polling cycle (e.g., the step before determining whether the initial or subsequent polling parameters may be adjusted). In an embodiment, the programming code and routines of checker 133 are included in polling program 132.

Calculator 134 in polling program 132 analyzes polling related data and information corresponding to a poll cycle and/or a poll group. Calculator 134 may determine adjustments to the polling parameters for a polling cycle based on a comparison of the number of events in EG queue 145 and LE queue 125 received from checker 133. Calculator 134 may initialize and track arrays of polling related data and poll groups. Additionally, calculator 134 may determine poll group statistics. Calculator 134 based, at least in part, on the statistics for the poll group, determines adjustments polling parameters to improve data and event flow between application 121 and EIS 140. Calculator 134 may receive or retrieve data and information such as poll quantity, poll frequency, maximum poll interval, queue size, average events polled and the like from checker 133, storage 135 and/or directly from application 121 and EIS 140. Additionally, calculator 134 may adjust polling parameters for a polling cycle based on an average number of non-consumed events (e.g., number of events in LE queue 125) in a large number of polling groups. In an embodiment, the programming code and routines of calculator 134 are included in polling program 132.

Storage 135 stores polling related data such as polling parameters. Storage 135 may receive initial polling parameters such as poll frequency and poll quantity, poll group size, initialization of arrays, and the like from a user or a system administrator. Storage 135 may send and receive data such as adjusted polling parameters and polling related data from application 121, adapter 130, polling program 132, and EIS 140. While depicted on adapter 130, in various embodiments, storage 135 resides in one or more separate databases within distributed data processing environment 100.

EIS 140 is an information system. As known to one skilled in the art, EIS 140 may reside in one or more computer systems or data centers that may be composed of one or more management server computers, web server computers, mainframe computers, desktop computing devices, mobile computing devices or any other electronic device or computing system capable of receiving, sending and processing data. In various embodiments, EIS 140 resides in a computer system or a server system utilizing clustered computers and components (e.g., database server computers, application servers, etc.) that act as a single pool of seamless resources such as used in a cloud-computing environment when accessed within distributed data processing environment 100. EIS 140 is depicted as sharing information and data with adapter 130; however, EIS 140 may share information such as the size of an event generation queue with more than one adapter 130. In various embodiments, EIS 140 communicates with application 121 through adapter 130 via network 110. EIS 140 may receive polling requests and send polling data such as a polling quantity number of events and EG queue 145 size with polling program 132 on adapter 130. EIS 140 includes EG (event generation) queue 145. While EIS 140 depicts one event generation queue, in an embodiment, EIS 140 includes more than one event generation queue.

EG queue 145 is a queue maintaining or storing information and data such as events received by EIS 140 for application 121 or generated from EIS 140 for application 121. EG queue 145 as depicted in FIG. 1, resides in EIS 140. In an embodiment, EG queue 145 resides in one or more other storage locations or databases accessed by EIS 140. In an embodiment, EG queue 145 sends data such as events to more than one adapter for more than one application.

Figure 2:
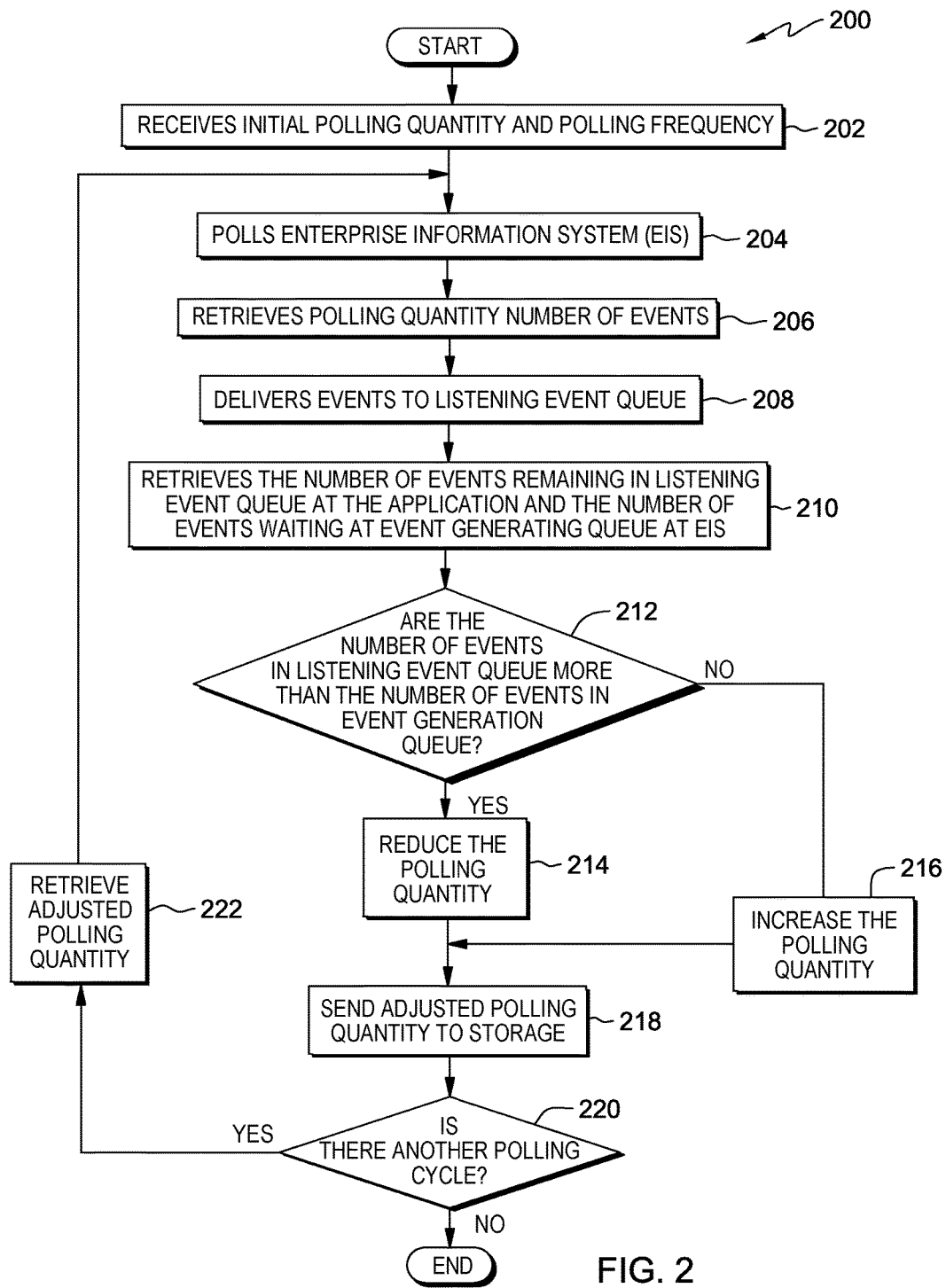
FIG. 2 is a flowchart depicting one example of a polling parameter determination method in accordance with at least one embodiment of the present invention.

FIG. 2 is a flowchart depicting one example of a polling parameter adjustment method 200 in accordance with at least one embodiment of the present invention. As depicted, FIG. 2 includes the steps utilized in polling parameter adjustment method 200 executed by server 120 to determine adjusted polling parameters based on a current polling cycle. Polling parameter adjustment method 200 determines an adjustment to initial polling parameters and subsequently determined polling parameters based, at least in part, on a comparison of the number of events in LE queue 125 and EG queue 145.

Polling parameter adjustment method 200 receives an initial polling quantity and an initial polling frequency (202) from a user or system administrator. In an embodiment, polling parameter adjustment method 200 retrieves a most recently or last stored polling quantity and a last or most recently stored polling frequency from storage 135 to use as initial polling parameters in the poll request. Using the initial polling quantity and polling frequency, polling parameter adjustment method 200 includes polling EIS 140 (204) and retrieving the polling quantity number of events (206) from EG queue 145 on EIS 140. Polling parameter adjustment method 200 includes retrieving the polling quantity number of events from EG queue 145. Polling parameter adjustment method 200 includes delivering an initial polling quantity of events to LE queue 125 (208). LE queue 125 stores the events for consumption by application 121. In polling parameter adjustment method 200, LE queue 125 receives the polling quantity number of events from EG queue 145 via polling program 132 on adapter 130.

Polling parameter adjustment method 200 includes retrieving the number of events in LE queue 125 remaining at application 121 and the number of events waiting in EG queue 145 at EIS 140 (210). At the end of the polling cycle (i.e., just before determining an adjustment to polling parameters in steps 212-216), polling parameter adjustment method 200 retrieves the number of events in LE queue 125 not consumed by application 121 and retrieves the number of events generated at the endpoint application (EIS 140) not yet retrieved from EG queue 145.

Polling parameter adjustment method 200 then determines whether the number of events in LE queue 125 are more than the number of events in EG queue 145 (decision 212). The difference in the size of LE queue 125 and EG queue 145 may be based, at least in part, on the difference in the rate of consumption at application 121 and the rate of generation and event retrieval from EIS 140. Polling parameter adjustment method 200 includes comparing the number of events in LE queue 125 and in EG queue 145, to determine if an adjustment to the polling parameters may improve data flow to manage event queue size at both application 121 and EIS 140.

If polling parameter adjustment method 200 determines the number of events in LE queue 125 are more than the number of events in EG queue 145 (yes branch, decision 212), then polling parameter adjustment method 200 includes reducing the polling quantity (214). For example, if the number of events in LE queue 125 are accumulating faster than the events are generated and/or retrieved from EG queue 145 then, reducing the number of events retrieved from EG queue 145 may prevent an excess accumulation of events and data in either LE queue 125 or EG queue 145 to balance queue sizes and improve data flow. Polling parameter adjustment method 200 reduces the polling quantity when the consumption of events by application 121 is not occurring as fast as events are generated and retrieved from the endpoint application (EIS 140).

The determination of the amount of change (e.g., reduction of a polling quantity) may occur in one of several ways. A system administrator or other system user may pre-set in polling program 132 or select the determination of the way the amount of change is determined, for example, using a pull-down menu. The amount of change in the polling quantity may be a polling quantity increment. For example, a polling quantity increment may be 100 and, in the example above, the polling quantity retrieved from EIS 140 reduces by 100 events. A change in a polling quantity may be an increase in a polling quantity (216) or may be a reduction in a polling quantity (214). While steps 214 and 216 discuss an increase or a decrease in the polling quantity, alternatively or additionally, polling parameter adjustment method 200 includes an increase or a decrease in the polling frequency. Polling frequency is the time interval between two poll cycles. When polling parameter adjustment method 200 determines that step 214 is applicable (an increase in polling quantity), in an alternative embodiment, polling parameter adjustment method 200 determines the time between polling cycles decreases (e.g., the polling frequency increases). In various embodiments, polling parameter adjustment method 200 includes receiving a user selection, in step 202, to adjust the initial polling quantity, the initial polling frequency or to adjust both the initial polling quantity and polling frequency.

A polling quantity increment may be a set amount of change in the polling quantity or it may be a variable amount of change as determined by polling parameter adjustment method 200. Similarly, a polling frequency increment can be a set or pre-determined size of a change in the polling frequency. In various embodiments, polling parameter adjustment method 200 includes configuring or receiving from a system administrator or other system user the polling quantity increment at initialization as a pre-set polling quantity increment.

In another embodiment, polling parameter adjustment method 200 retrieves from storage 135 the last used polling quantity increment for use as a pre-set polling quantity increment. Similarly, in an embodiment, polling parameter adjustment method 200 retrieves the last used polling frequency increment as the polling frequency increment or amount of change in a polling frequency adjustment.

In other embodiments, polling parameter adjustment method 200 includes calculating the amount of change in a polling quantity or in a polling frequency for a polling quantity increment. For example, if the number of events in LE queue 125 are 20% more than the number of events in EG queue 145, then, polling parameter adjustment method 200 may reduce the initial or the previous polling quantity by 10% (e.g., one half of the difference in queue size). In this example, the amount of reduction in the polling quantity increment may be a variable amount of change based on the percent of difference in queue size between LE queue 125 and EG queue 145. In one embodiment, polling parameter adjustment method 200 reduces the initial polling quantity by the same percentage as the difference in LE queue size and EG queue size (e.g., reduces initial polling quantity by 20% when LE queue 125 is 20% larger than EG queue 145). A similar method may be used to calculate a variable amount of change in the polling frequency.

Alternatively, in an embodiment, polling parameter adjustment method 200 includes decreasing the polling frequency in step 214 (i.e., increasing polling interval or increasing the time between poll requests) when the number of events in LE queue 125 are more than the number of events in EG queue 145. In this case, polling parameter adjustment method 200 decreases the polling frequency rather than reducing the initial or previous polling quantity in order to decrease the unconsumed events accumulating at LE queue 125. As previously discussed, the amount of the change in the polling frequency may be pre-set by a system administrator or may calculated by polling parameter adjustment method 200.

Alternatively, in an embodiment, both the polling quantity and the polling frequency are adjusted in polling parameter adjustment method 200. As discussed above the amount of the decrease of the initial polling frequency and initial polling quantity may correspond to the percent of the difference in the queue size between LE queue 125 and EG queue 145 or the decrease of the initial polling frequency and the initial polling quantity may be a pre-set interval such as a pre-set polling quantity interval of 100.

However, if polling parameter adjustment method 200 determines the number of events at LE queue 125 are not more than the number of events in EG queue 145 (no branch, decision 212), then polling parameter adjustment method 200 may use calculator 134 to increase the polling quantity (216). Polling parameter adjustment method 200 may use one of the methods discussed previously to determine an amount of the adjustment or increase in the initial polling quantity or previous polling quantity. Polling parameter adjustment method 200 includes sending adjusted or increased polling quantity to storage 135. Alternatively, in step 216, an adjusted or reduced polling frequency may be determined and sent to storage 135 instead of an adjusted polling quantity. Polling parameter adjustment method 200 stores the adjusted polling parameters for use in a subsequent polling cycle.

After reducing the polling quantity in step 214 and/or increasing the polling quantity in step 216, polling parameter adjustment method 200 includes sending the adjusted polling quantity to storage 135 (218). The adjusted polling quantity may be stored in storage 135 for use in the next polling cycle.

Polling parameter adjustment method 200 includes determining whether there is another polling cycle (decision 220) to be performed. If polling parameter adjustment method 200 does not determine another polling cycle remains to be performed (e.g., when the number of polling cycles indicated by a user at initialization are complete), (no branch, decision 220), then polling parameter adjustment method 200 ends. However if polling parameter adjustment method 200 determines there is another poll cycle (yes branch, decision 220) remaining to be performed, then polling parameter adjustment method 200 includes retrieving the adjusted polling quantity (222) from storage 135 in adapter 130 and the method includes performing another polling cycle with the adjusted polling quantity and repeating steps 204 to 222. With each polling cycle, polling parameter adjustment method 200 includes iteratively adjusting polling quantities according to the rate of consumption of events at application 121 and the rate of event generation and event retrieval from EIS 140 by adapter 130 based on a comparison of the resulting queue sizes at LE queue 125 and EG queue 145 at the end of a polling cycle. Alternatively, polling parameter adjustment method 200 may retrieve an adjusted polling frequency and continue with steps 204 to 222 until polling cycles are complete.

Figure 3:
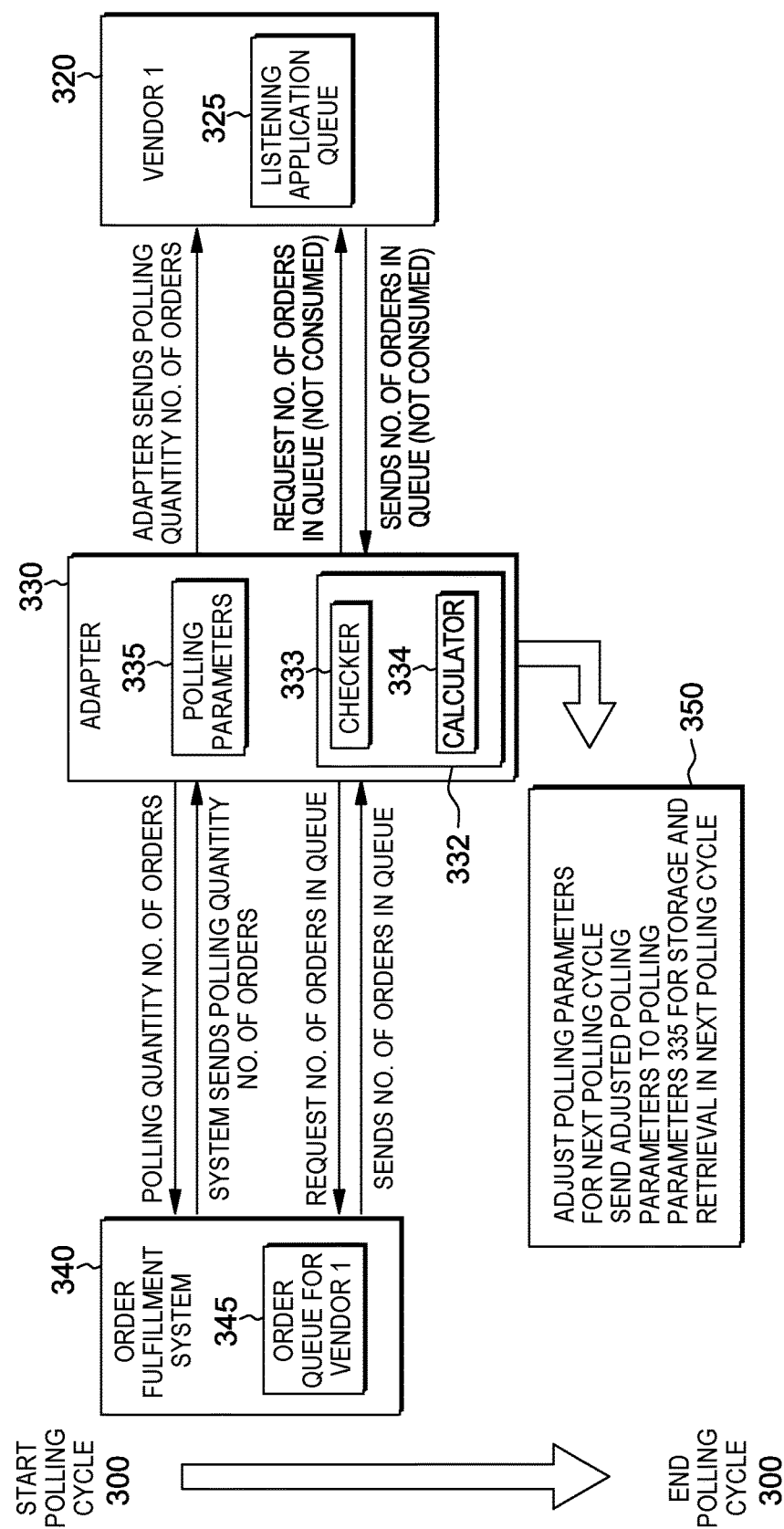
FIG. 3 is an illustration depicting an example of a polling cycle in accordance with at least one embodiment of the present invention.

FIG. 3 is an illustration depicting an example of a polling cycle 300 in accordance with at least one embodiment of the present invention. As depicted, FIG. 3 includes order fulfillment system 340, adapter 330 and vendor 320. FIG. 3 is an illustrative example of a polling cycle 300 using order fulfillment system 340 as an endpoint application or EIS after polling program 332 on adapter 330 receives initial polling parameters. Polling cycle 300 may use checker 333 and calculator 334 in polling program 332 to adjust order flow from order fulfillment system 340, which receives orders from customers that are placed in order queue 345 for delivery to listening application queue 325 on vendor 320. Checker 333 and calculator 334 in polling program 332 that perform the same function as checker 133, calculator 134 and polling program 132 discussed in FIG. 1 while polling parameters 335 is a storage element with a function similar to storage 135 in FIG. 1.

At the start of polling cycle 300, polling program 332 sends a polling request for a polling quantity number of orders using the initial or the most recent polling quantity retrieved from polling parameters 335. Upon receiving the polling request, order fulfillment system 340 sends the polling quantity number of orders to vendor 320 via polling program 132 on adapter 330. Vendor 320 receives the polling quantity number of orders from polling program 332 and stores them in listening application queue 325 for consumption (i.e., order fulfillment) by vendor 320. Before the completion of polling cycle 300, checker 333 sends a request to order fulfillment system 340 and to vendor 320 for the number of orders waiting in order queue 345 and listening application queue 325 respectively.

Upon receiving the number of orders in the respective queues in order fulfillment system 340 and vendor 320, calculator 334 in polling program 332 may determine if an adjustment to the initial polling quantity or the polling quantity used in the previous polling cycle may be calculated to improve order flow and order fulfillment (e.g., by preventing excess order accumulation at either vendor 320 or order fulfillment system 340). Calculator 334 compares queue sizes at the endpoint application (e.g., order fulfillment system 340) and vendor 320 to determine if there are more orders awaiting delivery to customers by vendor 320 than orders in order queue 345 at order fulfillment system 340. As previously discussed, if more orders are in listening application queue 325 at vendor 320 awaiting processing/customer delivery, than orders waiting in order queue 345 at order fulfillment system 340, then calculator 334 reduces the most recent or previously used polling quantity. Alternatively, calculator 334 may decrease the polling frequency when the number of orders in LE queue 125 is greater than the number of orders in EG queue 145 in order to manage or improve order fulfillment based on the rate of consumption by vendor 320 and the rate of generation and retrieval from order fulfillment system 340. In the case where both order queue 345 and listening application queue 325 are equal, no adjustment may be applied to the polling parameters. As depicted in block 350, the adjusted polling quantity and/or the adjusted polling frequency is sent to polling parameters 335 for storage and polling cycle 300 ends. Polling program 332 determines if there is another polling cycle (e.g., not depicted in FIG. 3 but, as discussed previously in FIG. 2, step 220).

Figure 4:
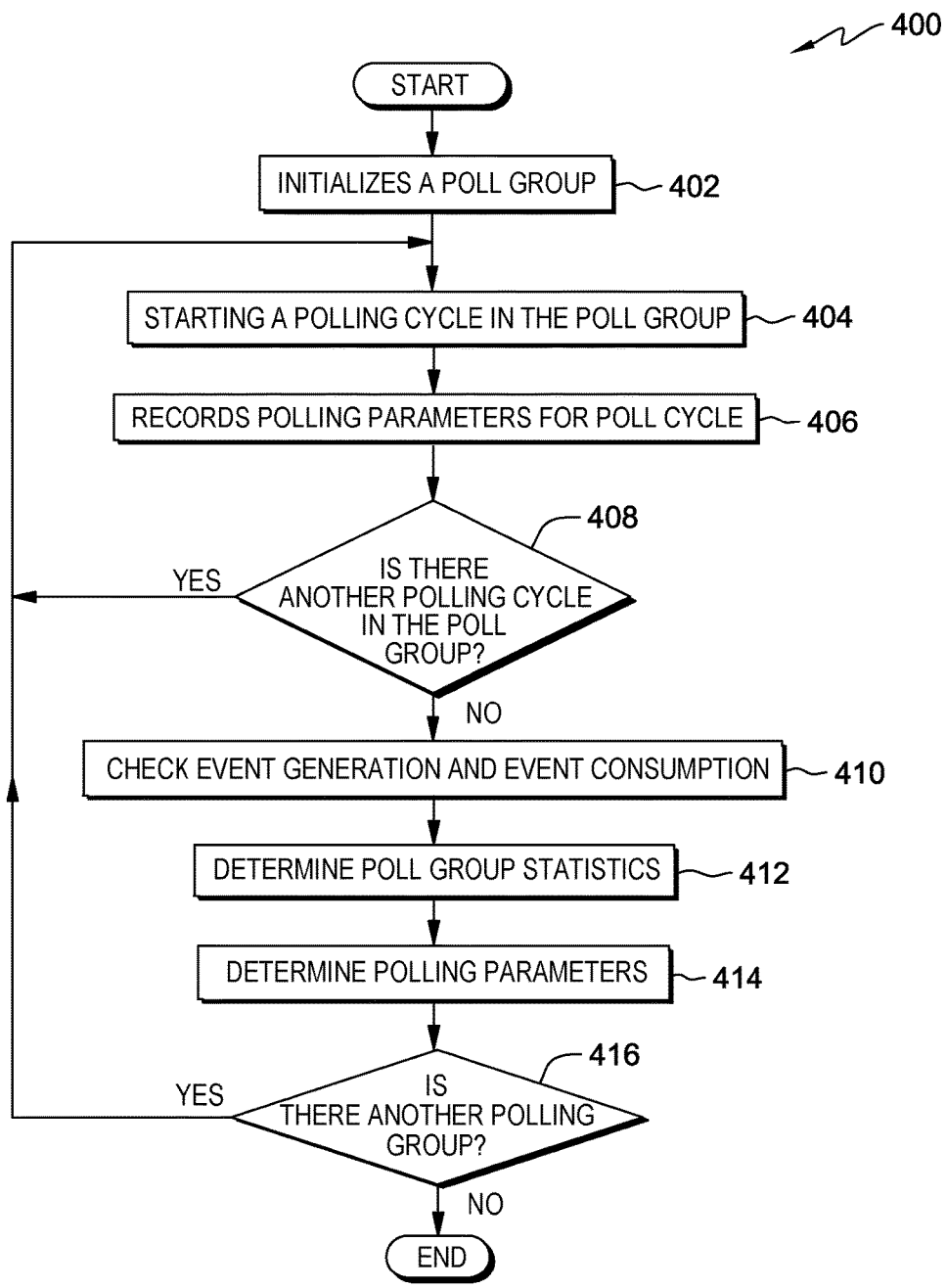
FIG. 4 is a flow chart depicting a polling parameter determination for a poll group in accordance with at least one embodiment of the present invention.

FIG. 4 is a flow chart depicting a polling parameter determination method 400 for a poll group in accordance with at least one embodiment of the present invention. Polling parameter determination method 400 executed by a polling program such as polling program 132 on server 120 includes the steps of polling parameter adjustment method 200 for a polling cycle expanded to include polling parameter adjustment based, at least in part, on a poll group composed of more than one polling cycle. As depicted, FIG. 4 includes the steps for polling parameter determination method 400 associated with a poll group based, at least in part, on the consumption pattern of events by the external application (i.e., application 121) as performed by a polling program (e.g., polling program 132) on an adapter. In addition to using the consumption pattern of events by application 121, polling parameter determination method 400 for a poll group includes the use of polling parameter statistics gathered during the polling cycles in the poll group. The polling parameter statistics may aid in determining adjusted polling parameters for the poll group.

Polling parameter determination method 400 includes the initialization of a poll group (402). The initialization of the poll group includes initializing arrays and queues utilized by the poll group and setting initial polling parameters for the poll group. The initial polling parameters include an initial polling quantity, an initial polling frequency and a poll group size where the poll group size indicates the number of polling cycles in a poll group. In an embodiment, the initial polling frequency may also be set an initial polling interval (i.e., the time between polling events) and polling parameter determination method 400 tracks the polling intervals in a poll cycle and a poll group. Initializing arrays, queues, polling parameters and setting poll group size, may be done by a system administrator or other user. In an embodiment, polling parameter determination method 400 retrieves the last previously used settings or determined values for poll group size, arrays, queues, polling parameters including polling frequency, minimum polling quantity, and the like. Polling parameter determination method 400 may include storing initial parameters and arrays in a database or storage (e.g., storage 135).

For example, polling parameter determination method 400 may include initializing an array that uses calculator 134 to track the time taken to complete the polling cycle. The time taken to complete the polling cycles may be stored as input in an array slot. The array has as many slots as there are polling cycles in the poll group. Another array of equal length may be initialized to record the number of events in each poll cycle of the poll group.

Polling parameter determination method 400 may include the initialization of other additional arrays. For example, one array may be initialized to store the average time taken for a single polling cycle across a number of poll groups. Polling parameter determination method 400 may initialize another array to track the average number of non-consumed events in a polling cycle (i.e., the number of events remaining the listening queue at the application) over a number of polling groups. Polling parameter determination method 400 may use calculator 134 on adapter 130 to track the initialized arrays.

Polling parameter determination method 400 includes executing a polling cycle in the poll group (404). Using the steps previously discussed in reference to FIGS. 2 and 3, polling parameter determination method 400, includes executing a first polling cycle by polling EIS 140 for an initial polling quantity number of events and determines adjusted polling parameters (e.g., an adjusted polling quantity). In subsequent polling cycles, polling parameter determination method 400 retrieves the most recently stored adjusted polling parameters used for executing the next poll cycle.

Polling parameter determination method 400 includes recording the polling parameters for the polling cycle (406). The recorded polling parameters include, at least, a polling quantity that is an actual number of events retrieved for the polling cycle, the polling frequency and the adjusted polling parameters that are determined as a result of the polling cycle. Additionally, polling parameter determination method 400 may include tracking and recording various values in the arrays, queues, lists and other data structures in the endpoint application (e.g., EIS 140) and the external application (e.g., application 121). The recorded polling parameters for the polling cycle are sent to storage (e.g., storage 135).

Next, polling parameter determination method 400 includes determining whether there is another polling cycle in the poll group (decision 408). If there is another polling cycle in the poll group (yes branch, decision 408), then polling parameter determination method 400 executes a poll cycle in the poll group (404). In this example, polling parameter determination method 400 executes the next polling cycle in the polling group using the adjusted polling parameters (e.g., an adjusted polling quantity) from the previous polling cycle. As long as there are additional polling cycles in the poll group, steps 404 to 408 are iteratively repeated using the adjusted polling parameters determined from the previous polling cycle.

However, when there is not another polling cycle in the polling group (no branch, decision 408), then polling parameter determination method 400 includes checking event generation and event consumption (410). For example, a checker software element in a polling program on the adapter (e.g., checker 133 in polling program 132 on adapter 130) may retrieve from the event generation queue on EIS 140 (e.g., EG queue 145) the number events in the event generation queue and the event generation rate from the event generation queue. The checker may retrieve from the listening event queue (e.g., LE queue 125) the event consumption. The event consumption may be the number of events not consumed by the application. Additionally, polling parameter determination method 400 includes retrieving the rate at which events are being consumed by the application as the event consumption. The rate of consumption at the application (e.g., application 121) may be determined by polling parameter determination method 400 as the number events consumed by the application in a period of time (e.g., the number events/fraction of a second).

Polling parameter determination method 400 includes determining poll group statistics (412). In polling parameter determination method 400, determining group statistics for the poll group may be performed on the adapter by a polling program (e.g., polling program 132) using calculator in the polling program (e.g., calculator 134). Poll group statistics may include an average time taken, an average number of events polled, a cumulative average time taken for the poll group, and cumulative average number of events polled for the poll group. The average time taken variable contains the average time taken to consume the polled events for the recently or last completed or previous polling cycle. The average number of events polled variable contains the average number of events polled for the just completed polling cycle. The cumulative average time taken averages the average time taken for a group of poll groups. The queue average time taken is an array of length equal to the maximum number of iterations in the most recently completed polling cycle. Using the values of the queue average time taken, a value equal to the average of all of the last number of maximum iterations for the poll groups are generated and stored in the cumulative average time taken. Similarly, a cumulative average number of events polled may be determined and stored as value equal to the average of the average events polled over the maximum number of iterations.

Polling parameter determination method 400 includes using the poll group statistics, to determine the polling parameters (414) for one or more poll groups. For example, polling parameter determination method 400 includes adjusting polling quantity and/or adjusting polling frequency in step 414 for the determination of polling parameters using poll group statistics determined in the previous step (step 412). If polling parameter determination method 400 determines the average events polled for the last polling cycle in the poll group equals the polling quantity from the last polling cycle in the poll group, then polling parameter determination method 400 may increase the polling quantity by the poll quantity increment. Polling parameter determination method 400 may, using a polling program (e.g., calculator 134 in polling program 132), determine the amount of increase (or decrease) in the polling quantity by one of the previously discussed methods. In this case, increasing the polling quantity ensures that the link between the application and the EIS is not under-utilized.

As previously discussed, amount or size of the change in the polling quantity may be defined or configured by a system administrator or may be determined as a correlation to a difference in queue sizes in EIS 140 and application 121 (e.g., based on a rate of generation and consumption at EIS 140 and consumption rate at application 121). The determined polling quantity is stored, for example, in a database or storage (e.g., storage 135) by polling parameter determination method 400.

When the average events polled are less than the polling quantity for the last polling cycle in the polling group as occurs when more events are being polled than are available, polling parameter determination method 400 reduces the poll quantity to the maximum of the minimum poll quantity in the poll group and cumulative average number of events polled. Additionally, polling parameter determination method 400 includes setting the poll frequency or poll interval to the minimum of the maximum polling frequency in the poll group and the cumulative average time taken.

Polling parameter determination method 400 includes determining whether there is another polling group (decision 416). When polling parameter determination method 400 determines that there is another poll group (yes branch, decision 416), then polling parameter determination method 400 initializes a poll group (402) using previously discussed methods. However, if polling parameter determination method 400 determines that there is not another poll group (no branch, decision 416), then the method and polling parameter determination method 400 ends.

Using a method as discussed in polling parameter determination method 400, the effects of polling parameter adjustments create a method for creating a link between an adapter and an application for more efficient information flow between an adapter and an application. Additionally, the methods discussed in polling parameter adjustment method 200 and polling parameter determination method 400 ensure efficient information flow from an endpoint application (e.g., EIS 140) through an adapter to an application (e.g., application 121).

Figure 5:
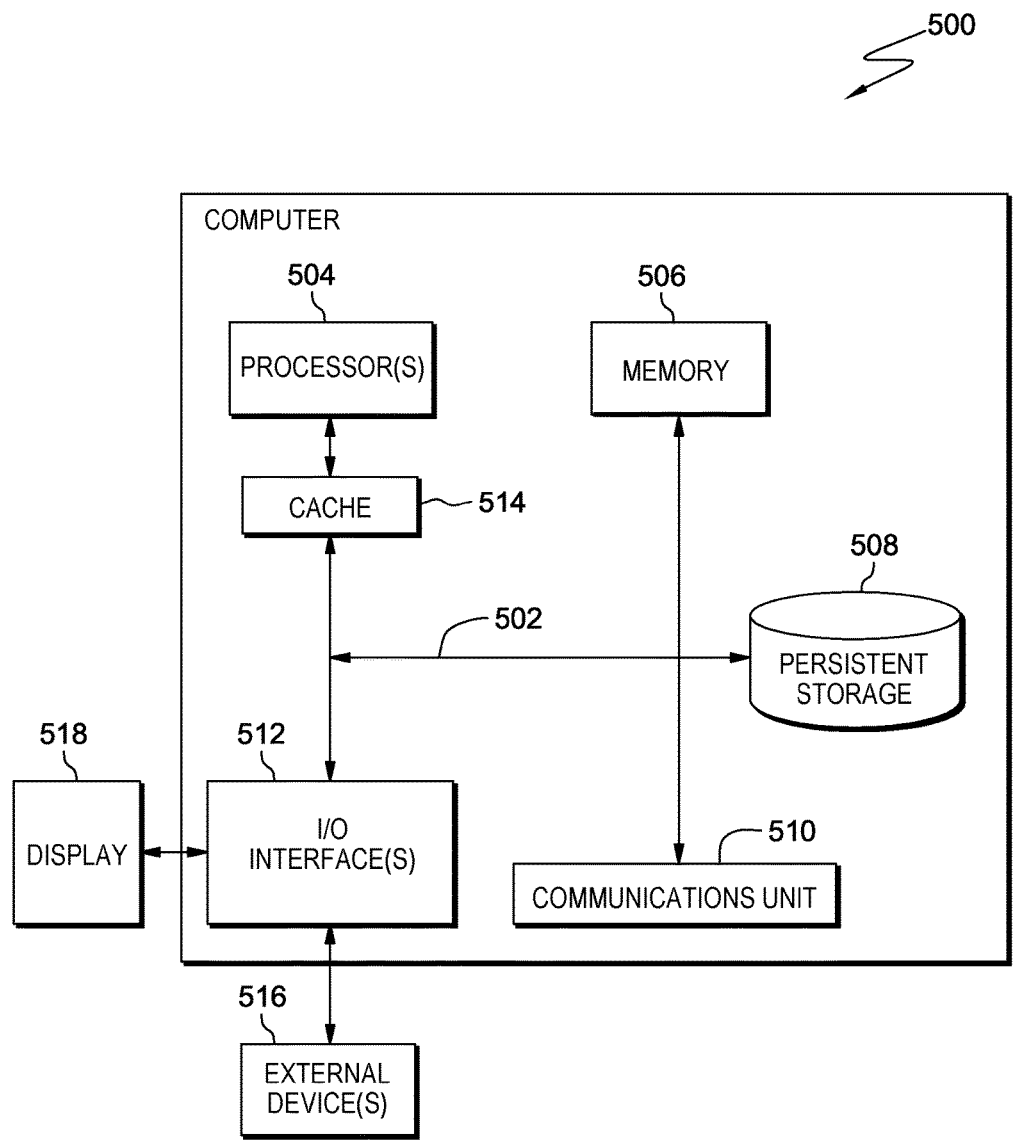
FIG. 5 is a block diagram depicting components of a computer system in accordance with at least one embodiment of the present invention.

FIG. 5 depicts a block diagram 500 of components of a computer system, which is an example of a system such as server 120 within distributed data processing environment 100, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server 120 includes processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510 and input/output (I/O) interface(s) 512. Communications fabric 502 can be implemented with any architecture designed for passing data and/or control information between processors (such as microprocessors, communications and network processors, etc.), system memory, peripheral devices and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data and data near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory or any other computer readable storage media that is capable of storing program instructions or digital information.

The media used by persistent storage 508 may also be removable. For example, a removable hard drive may be used for persistent storage 508. Other examples include optical and magnetic disks, thumb drives and smart cards that are inserted into a drive for transfer onto another computer readable storage medium that is part of persistent storage 508.

Communications unit 510, in these examples, provides for communications with other data processing systems or devices, including resources of server 120 and other computing devices not shown in FIG. 1. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server 120. For example, I/O interface(s) 512 may provide a connection to external device(s) 516 such as a keyboard, a keypad, a touch screen, a microphone, a digital camera and/or some other suitable input device. External device(s) 516 can also include portable computer readable storage media, for example, devices such as thumb drives, portable optical or magnetic disks and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device. The computer readable program instructions may cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, a segment or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

What is claimed is:

1. A method for adjusting polling parameters, comprising:
    receiving, by one or more processors, at least an initial polling quantity and an initial polling frequency;
    polling, by one or more processors, an endpoint application using the initial polling quantity and the initial polling frequency;
    determining, by one or more processors, a first number of events not consumed in a queue of a listening application and a second number of events generated at the endpoint application and remaining in a queue at the endpoint application;
    comparing, by one or more processors, the first number of events not consumed in the queue of the listening application and the second number of events generated at the endpoint application and remaining in the queue at the endpoint application at the end of a polling cycle; and
    adjusting, by one or more processors, at least one of the initial polling quantity and the initial polling frequency based, at least in part, on the comparison of the first number of events not consumed in the queue of the listening application and the second number of events generated at the endpoint application and remaining in the queue at the endpoint application.

2. The method of claim 1, wherein providing, by one or more processors, the one or more adjusted polling parameters further comprises:
    determining, by one or more processors, whether the first number of events not consumed in the queue of the listening application is greater than the second number of events generated and remaining in the queue at the endpoint application at the end of the polling cycle; and
    responsive to determining that the first number of events not consumed in the queue of the listening application is greater than the second number of events generated at the endpoint application, adjusting, by one or more processors, at least one of the initial polling quantity and the initial polling frequency;
    wherein adjusting includes at least one of reducing the initial polling quantity and reducing the initial polling frequency.

3. The method of claim 1, wherein providing, by one or more processors, the one or more adjusted polling parameters further comprises:
    determining, by one or more processors, when the first number of events not consumed in a queue of the listening application is less than the second number of events generated in the queue at the endpoint application at the end of the polling cycle; and
    responsive to determining that the first number of events not consumed in the queue of the listening application is less than the second number of events generated in the queue at the endpoint application, adjusting, by one or more processors, at least one of the initial polling quantity and the initial polling frequency;
    wherein adjusting includes at least one of increasing the initial polling quantity and increasing the initial polling frequency.

4. The method of claim 1, further comprising polling, by one or more processors, the endpoint application with the one or more adjusted polling parameters.

5. The method of claim 1, wherein a checker in a software adapter determines the first number of events not consumed in the queue of the listening application and the second number of events generated at the endpoint application and remaining in the queue at the endpoint application.

6. The method of claim 1, wherein a calculator in a software adapter compares the first number of events not consumed in the queue of the listening application and the second number of events generated at the endpoint application and remaining in the queue at the endpoint application.

7. The method of claim 1, further comprises:
   determining, by one or more processors, a next number of events not consumed in the queue of a listening application and a next number of events generated and remaining in the queue at the endpoint application;
   comparing, by one or more processors, the next number of events not consumed in the queue of the listening application and the next number of events generated and remaining in the queue at the endpoint application; and
   providing, by one or more processors, one or more second adjusted polling parameters based, at least in part, on the comparison of the next number of events not consumed in the queue of the listening application and the next number of events generated at the endpoint application.

8. The method of claim 7, wherein the second adjusted polling parameter is at least one of a second adjusted polling quantity and a second adjusted polling frequency.

9. The method of claim 1, further comprising:
   initializing, by one or more processors, a poll group:
      wherein initializing includes receiving from a user a plurality of initial values for at least a poll group size, a maximum poll interval, and a minimum poll quantity;
   executing, by one or more processors, a first poll cycle in the poll group;
   recording, by one or more processors, poll data for the first poll cycle in the poll group;
   executing, by one or more processors, at least another poll cycle in the poll group;
   determining, by one or more processors, there are no other poll cycles in the poll group;
   determining, by one or more processors, a plurality of statistics for the poll group;
   determining, by one or more processors, one or more adjusted polling parameters based, at least in part, on the plurality of statistics for the poll group; and
   determining, by one or more processors, whether there is another poll group.

10. The method of claim 9, wherein the plurality of statistics include at least an average time taken for the poll cycles in the poll group, an average number of events polled for the poll cycles in the poll group, a cumulative average time taken for the poll group and a cumulative average number of events for the poll group.

11. The method of claim 10, wherein determining, by one or more processors, the one or more adjusted polling parameters further comprises responsive to determining that the average number of events polled is less than a polling quantity in a last polling cycle in the poll group, reducing the polling quantity to either a maximum of the minimum poll quantity or the cumulative average time taken for the poll group.

12. The method of claim 10, wherein determining, by one or more processors, the one or more adjusted polling parameters further comprises responsive to determining that the average number of events polled is less than a polling quantity of a last polling cycle in the poll group, setting the poll interval to a minimum of a lesser of a maximum poll interval and the cumulative average time taken for the poll group.

13. A computer program product for adjusting polling parameters, comprising:
   one or more computer readable storage media and program instructions stored on the one or more computer readable storage media, the program instructions executable by a processor, the program instructions comprising instructions for:
   receiving at least an initial polling quantity and an initial polling frequency;
   polling an endpoint application using the initial polling quantity and the initial polling frequency;
   determining a first number of events not consumed in a queue of a listening application and a second number of events generated at the endpoint application and remaining in a queue at the endpoint application;
   comparing the first number of events not consumed in the queue of the listening application and the second number of events generated at the endpoint application and remaining in the queue at the endpoint application at the end of a polling cycle; and
   adjusting at least one of the initial polling quantity and the initial polling frequency based, at least in part, on the comparison of the first number of events not consumed in the queue of the listening application and the second number of events generated at the endpoint application and remaining in the queue at the endpoint application.

14. The computer program product of claim 13, wherein providing the one or more adjusted polling parameters further comprises:
   determining whether the first number of events not consumed in the queue of the listening application is greater than the second number of events generated and remaining in the queue at the endpoint application at the end of the polling cycle; and
   responsive to determining that the first number of events not consumed in the queue of the listening application is greater than the second number of events generated at the endpoint application, adjusting at least one of the initial polling quantity and the initial polling frequency;
      wherein adjusting includes at least one of reducing the initial polling quantity and reducing the initial polling frequency.

15. The computer program product of claim 13, wherein providing the one or more adjusted polling parameters further comprises:
   determining whether the first number of events not consumed in a queue of the listening application is less than the second number of events generated in the queue at the endpoint application at the end of the polling cycle; and
   responsive to determining that the first number of events not consumed in the queue of the listening application is less than the second number of events generated in the queue at the endpoint application, adjusting at least one of the initial polling quantity and the initial polling frequency;
      wherein adjusting includes at least one of increasing the initial polling quantity and increasing the initial polling frequency.

16. The computer program product of claim 13, further comprises:
   initializing a poll group:
      wherein initializing includes receiving from a user a plurality of initial values for at least a poll group size, a maximum poll interval, and a minimum poll quantity;
   executing a first poll cycle in the poll group;
   recording poll data for the first poll cycle in the poll group;

executing at least another poll cycle in the poll group;
determining there are no other poll cycles in the poll group;
determining a plurality of statistics for the poll group;
determining one or more adjusted polling parameters based, at least in part, on the plurality of statistics for the poll group; and
determining whether there is another poll group.

17. The computer program product of claim 13, wherein determining the one or more adjusted polling parameters further comprises responsive to determining that an average number of events polled is less than a polling quantity in a last polling cycle in a poll group, reducing the polling quantity to either a maximum of the minimum poll quantity or a cumulative average time taken for the poll group.

18. A computer system comprising:
one or more computer processors;
one or more computer readable storage media; and
program instructions stored on the one or more computer readable storage media for execution by at least one of the one or more computer processors, the program instructions comprising instructions to perform a method comprising:
receiving at least an initial polling quantity and an initial polling frequency;
polling an endpoint application using the initial polling quantity and the initial polling frequency;
determining a first number of events not consumed in a queue of a listening application and a second number of events generated at the endpoint application and remaining in a queue at the endpoint application;
comparing the first number of events not consumed in the queue of the listening application and the second number of events generated at the endpoint application and remaining in the queue at the endpoint application at the end of the polling cycle; and
adjusting at least one of the initial polling quantity and the initial polling frequency based, at least in part, on the comparison of the first number of events not consumed in the queue of the listening application and the second number of events generated at the endpoint application and remaining in the queue at the endpoint application.

19. The computer system of claim 18, wherein providing the one or more adjusted polling parameters further comprises:
determining whether the first number of events not consumed in the queue of the listening application is less than the second number of events generated in the queue at the endpoint application at the end of the polling cycle; and
responsive to determining that the first number of events not consumed in the queue of the listening application is less than the second number of events generated in the queue at the endpoint application, adjusting at least one of the initial polling quantity and the initial polling frequency;
wherein adjusting includes at least one of increasing the initial polling quantity and increasing the initial polling frequency.

20. The computer system of claim 18, further comprises:
initializing a poll group:
wherein initializing includes receiving from a user a plurality of initial values for at least a poll group size, a maximum poll interval, and a minimum poll quantity;
executing a first poll cycle in the poll group;
recording poll data for the first poll cycle in the poll group;
executing at least another poll cycle in the poll group;
determining there are no other poll cycles in the poll group;
determining a plurality of statistics for the poll group;
determining one or more adjusted polling parameters based, at least in part, on the plurality of statistics for the poll group; and
determining whether there is another poll group.

* * * * *